W. BROOKFIELD.
MODE OF MAKING TELEGRAPH INSULATORS.
No. 113,393.  Patented Apr. 4, 1871.
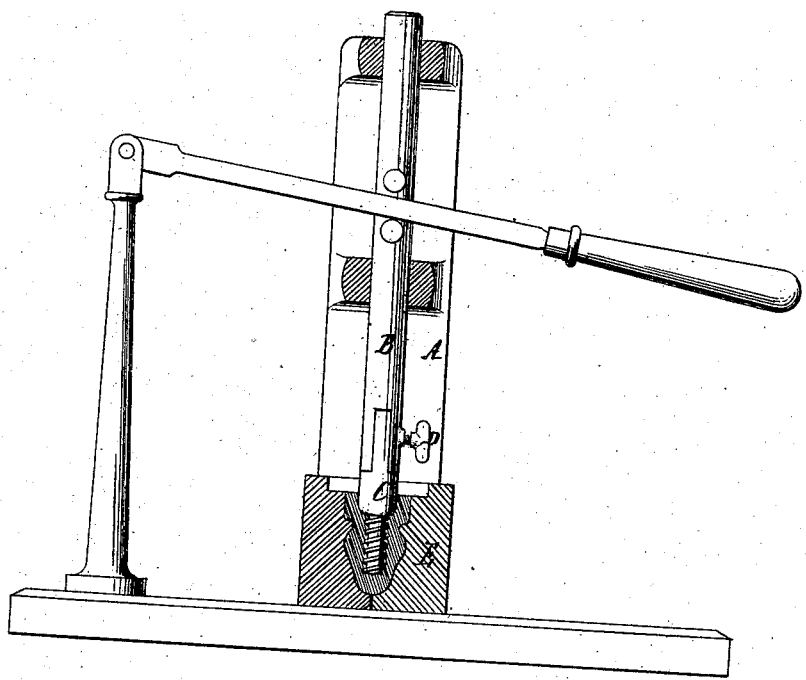
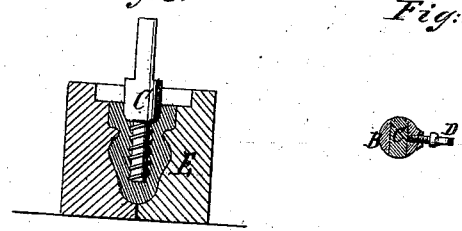

United States Patent Office.

WILLIAM BROOKFIELD, OF NEW YORK, N. Y.

Letters Patent No. 113,393, dated April 4, 1871.

IMPROVEMENT IN THE MODES OF MAKING TELEGRAPH-INSULATORS.

The Schedule referred to in these Letters Patent and making part of the same.

*To all whom it may concern:*

Be it known that I, WILLIAM BROOKFIELD, of the city, county, and State of New York, have invented a new and improved Mode of Making Telegraph-Insulator; and I do hereby declare the following to be a full, clear, and exact description thereof, which will enable those skilled in the art to make and use the same, reference being had to the accompanying drawing forming part of this specification, in which drawing—

Figure 1 is an elevation, partly in section, of a lever-press with detachable screw-plunger or former, and a mold for telegraph-insulators.

Figure 2 is a cross-section through the spindle of the press, showing one form of detachable connection with the screw-plunger.

Figure 3 is a section of the mold and plunger detached.

Similar letters indicate corresponding parts.

This invention relates to the manufacture of screw telegraph-insulators, of glass or other molten material; and consists in a new and improved process, by which I subject the molten glass or metal in the mold to the action of a press, to whose spindle is connected a screw-plunger or former, by a detachable connection, and after the screw-plunger has been pressed or forced into the glass or metal, and the socket and screw-thread in the insulator formed, I disconnect the screw-plunger or former from the press and withdraw the mold, with the plunger remaining therein, from the press.

I then connect a fresh screw-plunger or former to the spindle of the press in readiness to press or force into the next mold, and so proceed, using as many screw-plungers and molds as are necessary to keep the press employed, the detached plungers or formers being screwed out of the molds as soon as the glass or metal has "set."

In carrying out my process I use a lever or a screw-press, but in the present illustration I have selected a lever-press, A, to whose spindle B I attach a screw-plunger or former, C, by a detachable connection, so that the renewal of the plunger can be easily and rapidly effected.

The bottom of the spindle is slotted, in this example, to receive the shank of the screw-plunger, which is held to the spindle by a set-screw, D; but the bottom of the spindle may be made with a socket of any desired form, instead of being slotted across, as here shown, the shank of the spindle being made of a corresponding former to fit into the spindle easily, so that it can be connected or disconnected with facility.

A key or other fastening device can be used instead of a set-screw.

After the screw-plunger or former C is attached I raise the spindle of the press and place under the plunger a mold, E, containing the hot metal or glass, and press or force the plunger down into the mold, and immediately afterward detach the plunger, withdraw the mold with the newly-formed insulator and the screw-plunger therein, attach a fresh screw-plunger to the spindle and raise it, to allow a fresh mold with hot metal or glass to be placed on the press; when the operation is repeated, the screw-plungers being screwed out of the newly-formed insulator directly after the molds are withdrawn, or as soon as the metal or glass has set, the mold being then opened and the insulators taken out, so that the molds can be used in succession one after the other, two or more molds and screw-plungers being used advantageously in the process.

My invention enables me to employ two or more screw-plungers and as many molds continuously in connection with a single press in the manufacture of screw-telegraph insulators, and to dispense with the operation of screwing the screw-plunger out of the newly-formed insulator by means of the press before the mold can be removed therefrom.

In screwing the plunger out after the glass has set any suitable tool or wrench may be used; or the plunger may be attached to a screw-spindle or other mechanism, so that it can be screwed out true and without injuring the thread in the insulator.

I do not claim anything new in the construction of the press which I use in carrying out my invention: but

What I claim as new, and desire to secure by Letters Patent, is—

The within-described process for making screw-telegraph insulators, said process consisting of the following successive operations: first, filling the mold with molten glass and depressing the plunger; second, releasing the plunger and raising the spindle of the press; third, removing the plunger and the mold from under the press; fourth, inserting a new plunger and fastening the same in the spindle, and introducing a fresh mold, all as herein set forth.

WM. BROOKFIELD.

Witnesses:
W. HAUFF,
E. F. KASTENHUBER.